United States Patent [19]

Mathews

[11] Patent Number: 5,035,263
[45] Date of Patent: Jul. 30, 1991

[54] ROTARY BEARING SEAL

[75] Inventor: W. Harry Mathews, Arvada, Colo.

[73] Assignee: Mark VII Equipment, Inc., Arvada, Colo.

[21] Appl. No.: 504,618

[22] Filed: Apr. 4, 1990

Related U.S. Application Data

[60] Division of Ser. No. 446,278, Dec. 14, 1989, abandoned, which is a continuation-in-part of Ser. No. 367,505, Jun. 16, 1989, abandoned.

[51] Int. Cl.$^5$ .............................................. F16L 27/00
[52] U.S. Cl. .................................... 137/615; 137/357; 137/580
[58] Field of Search ....................... 137/357, 615, 580; 285/273, 275

[56] References Cited

U.S. PATENT DOCUMENTS

| | | | |
|---|---|---|---|
| 543,008 | 7/1895 | Gale | 137/357 |
| 1,050,318 | 1/1913 | Weiss | 137/357 |
| 3,356,102 | 12/1967 | Johnson | 137/357 |
| 3,923,133 | 12/1975 | Chivari | 137/580 |
| 4,266,620 | 5/1981 | Wolganaft et al. | 137/580 |
| 4,501,442 | 2/1985 | Pardus | 285/275 |
| 4,538,639 | 9/1985 | Inaba et al. | 137/580 |

Primary Examiner—A. Michael Chambers
Attorney, Agent, or Firm—Gary M. Polumbus

[57] ABSTRACT

A vehicle wash apparatus includes a reciprocating gantry-type framework with rotating fluid dispensers along an upper extent thereof and at opposite sides thereof which are adapted to be rotated to deliver washing fluid at the vehicle as the apparatus traverses the length of the vehicle. A tilt mechanism is provided so that the rotating manifolds acan be tilted at opposite ends of the vehicle to direct the cleaning fluid at the ends of the vehicle when the apparatus is positioned adjacent the ends of the vehicle. A unique bearing seal element supports the rotating manifolds on a rotatably driven coupling from a motor so that liquid can be delivered to the rotating manifolds in a leak-free environment and over an extended life. An ultra-high molecular weight polyethylene material is utilized in bearing seal members in the element which serve both as a liquid seal and a bearing surface.

10 Claims, 4 Drawing Sheets

Fig_1

Fig_2

Fig_3

Fig_10

Fig_11

Fig_12

Fig_13

Fig_14

Fig_15

ROTARY BEARING SEAL

CROSS REFERENCE TO RELATED APPLICATIONS

This application is a division of a continuation-in-part application filed Dec. 14, 1989, under Ser. No. 07/446,278 entitled Rotary-Tiltable Car Wash System, now abandoned which is a C-I-P of 07/367,505 filed June 16, 1989, now abandoned.

BACKGROUND OF THE INVENTION

1. Field of the Invention

The present invention relates generally to automatic vehicle wash systems and more particularly to a reciprocating gantry-type wash system designed to efficiently wash the front and rear of the vehicle as well as the sides thereof.

2. Background of the Invention

There are many types of vehicle wash system adapted to readily clean a vehicle without the need of hand scrubbing. One basic form of wash system is merely to use a wand through which high-pressure water is emitted against the side of the vehicle with the wand normally being manipulated by an individual washing his or her own vehicle. More automated systems utilize the same concept of emitting jet sprays of water against the side of a vehicle but through use of an array of such nozzles disposed along both sides and across the top of the vehicle. Such arrays are sometimes adapted to move in a loop around the vehicle with the vehicle remaining in place while others move relative to the vehicle in a straight line along the length of the vehicle. In either event, the object is to expose the entire exterior surface of the vehicle to the jet sprays of water to remove dirt, scum and other road debris from the surface of the vehicle.

More elaborate vehicle wash systems which are generally more efficient in cleaning the exterior surface of the vehicle have been referred to as tunnel-type car wash systems wherein a vehicle is advanced through a series of stages spaced along a linear path with different operations occurring at the various stages as the vehicle is advanced through the tunnel. The various stages would include pre-soaking, rinsing, scrubbing, waxing, and other similar operations. Generally, in a tunnel-type wash system, a fabric curtain, commonly referred to as a mitter curtain, defines one of the washing stages with the mitter curtain being comprised of a plurality of strips of felt or other similar material which are rocked back and forth along the path of movement of the vehicle so that as the vehicle is moved thereby, the felt strips will abrasively scrub and remove dirt and other debris from the surface of the vehicle. While this scrubbing action normally takes place in combination with a soapy water to minimize scratching the paint on the vehicle, it has been determined that repeated usage of such a cleaning system has a detrimental effect on the paint in that minor scratches are imparted to the surface, either by the felt fabric itself or by the granular dirt particles that the curtain removes from the surface of the vehicle.

As a result of the detrimental abrasion of a mitter curtain on the paint of a vehicle, many vehicle owners prefer not to use tunnel-type wash systems and would rather prefer to use a system wherein water is merely directed at the surface of the vehicle in a high-pressure stream to remove dirt and other material from the surface thereof. Of these types of wash systems, the most common is what may be referred to as a reciprocating gantry-type system wherein a framework carrying spray nozzles disposed along an inverted U-shaped frame is moved reciprocally over the car to spray cleaning fluid thereon. It will be appreciated, however, that with such systems it is difficult to wash the front and rear of the vehicle as the nozzles through which the cleaning fluid is dispensed are usually directed perpendicularly to the line of movement of the apparatus and therefore are not directed at the front and rear of the vehicle.

While some systems have been devised for moving the sprays along a curved track in front and behind the vehicle, such systems are less than desirable in that they are normally mechanically more complex and require that the system be suspended from an overhead location rather than supported on the same surface as is the vehicle.

It is accordingly an object of the present invention to provide a car wash system of the type wherein a gantry-like apparatus is reciprocated over the vehicle but including a system for thoroughly cleaning the front and rear of the vehicle as well as the top and sides.

SUMMARY OF THE INVENTION

The vehicle wash apparatus of the present invention is of the reciprocating gantry type wherein an inverted U-shaped frame is mounted on longitudinally extending rails for reciprocating movement over a vehicle situated between the rails. The apparatus includes manifolds with high-pressure nozzles for dispensing cleaning fluids directly onto the vehicle. The dispensing manifolds are mounted so as to be tiltable relative to the vehicle whereby the angle at which the cleaning fluid is directed at the vehicle can be modified at the front and rear of the vehicle to direct the spray at these surfaces.

In the preferred form of the invention, the dispensing manifolds are rotated while directing cleaning fluid at the vehicle, and the entire rotating manifold is tilted when the apparatus approaches the front and rear of the vehicle to direct the cleaning fluid at the front and rear surfaces.

It will be appreciated that the apparatus of the present invention is described as being reciprocally mounted for movement relative to a vehicle being washed, but the principle features of the apparatus could be employed in a stationary apparatus wherein the vehicle was moved through the apparatus.

A unique bearing seal is utilized to support the rotating manifolds in a manner such that the high-pressure cleaning fluids can be directed through the bearing seal in a leak-proof manner.

Other aspects, features and details of the present invention can be more completely understood by reference to the following detailed description of a preferred embodiment, taken in conjunction with the drawings, and from the appended claims.

DESCRIPTION OF THE PREFERRED EMBODIMENT

Figure 1:
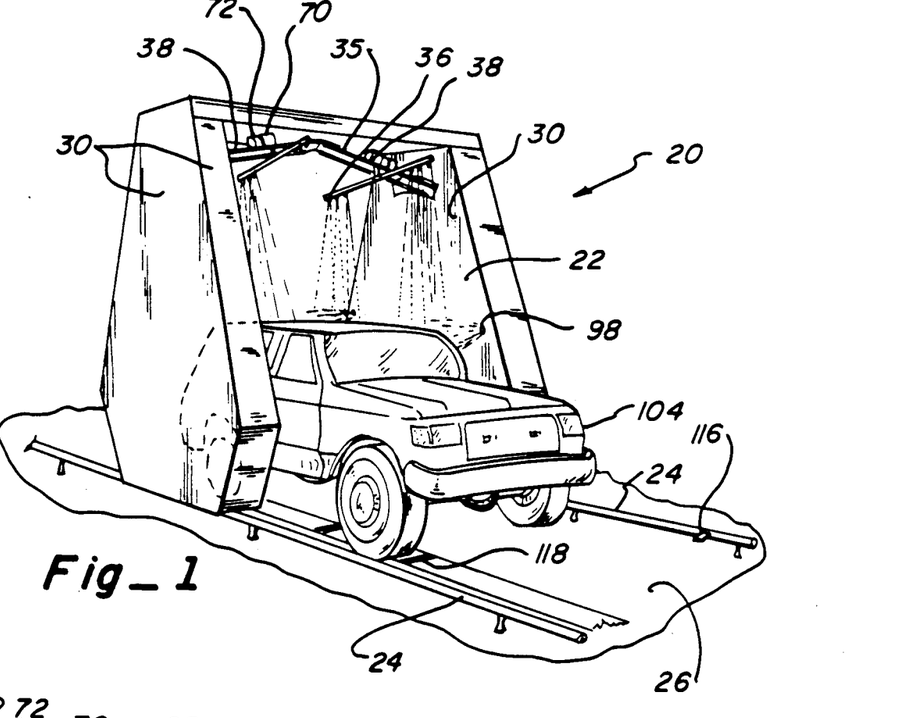
FIG. 1 is a perspective view of the apparatus of the present invention with a vehicle being shown in a position to be cleaned by the apparatus.
Figure 2:
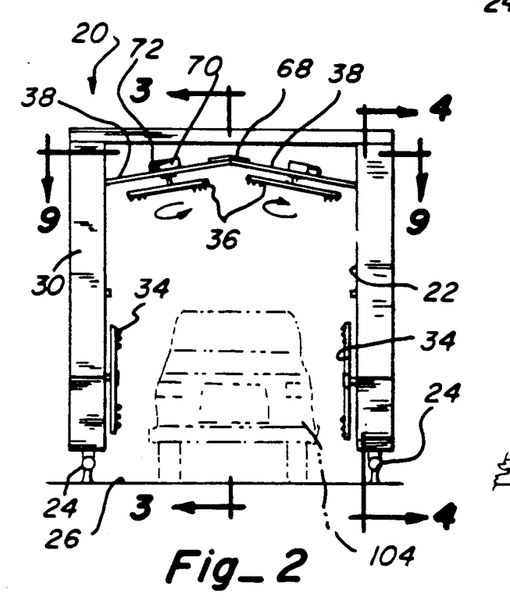
FIG. 2 is a front elevation of the apparatus shown in FIG. 1 with the vehicle shown in phantom lines.
Figure 3:
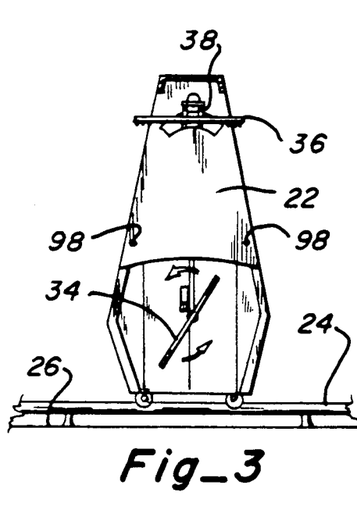
FIG. 3 is a vertical section taken along line 3—3 of FIG. 2.

Referring first to FIG. 1, the wash apparatus 20 of the present invention can be seen to be of the gantry-type and includes a framework 22 adapted to be reciprocally driven along a pair of a parallel rails 24 mounted on the floor 26 of a vehicle wash location. The parallel rails are cylindrical in configuration and define a driveway therebetween in which a vehicle can enter the apparatus, be temporarily stationed while being washed, and exit the apparatus by proceeding forwardly therefrom.

The apparatus of the invention includes an upstanding inverted U-shaped housing 28 forming a part of the framework 22 on which the working components of the apparatus are mounted. The housing includes a number of planar sheets 30 of suitable rigid material which are mounted upon horizontal and vertical frame members 32 disposed interiorly thereof. The housing sheets define an enclosure on opposite sides and across the top of the apparatus for working components of the apparatus.

Figure 10:
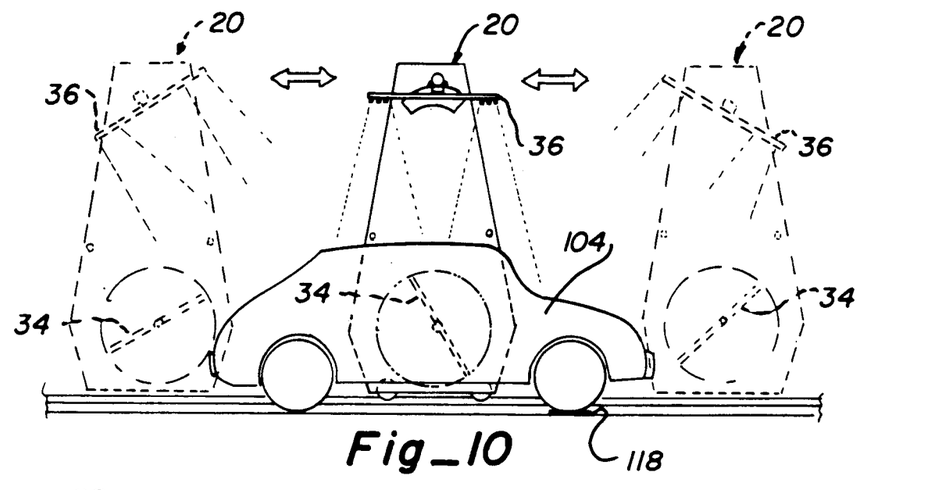
FIG. 10 is an operational view of the apparatus of the present invention shown in three different positions relative to a vehicle being cleaned thereby.

The apparatus 20 further includes a pair of vertically disposed rotating manifolds 34 positioned adjacent the lower ends of the sides of the housing and a pair of generally horizontally disposed rotating manifolds 36 mounted on frame members 38 that define an upper generally horizontal bridge between the sides of the housing. The upper rotating manifolds 36 can be seen to be disposed so as to direct washing fluid at the vehicle in a slightly downwardly convergent manner so that the fluids impinge the top of the vehicle as well as the sides thereof. The vertically oriented lower rotating manifolds 34 are disposed to direct washing fluids directly at the sides of the vehicle. As will be appreciated from the description that follows, both the vertical and horizontal rotating manifolds are mounted on tiltable mechanism so that the angle at which the washing fluid is dispensed at the vehicle can be varied depending upon the relative position of the vehicle and the apparatus as seen in FIGS. 9 and 10.

Figures 4, 5, 6, 7, 8, 9:
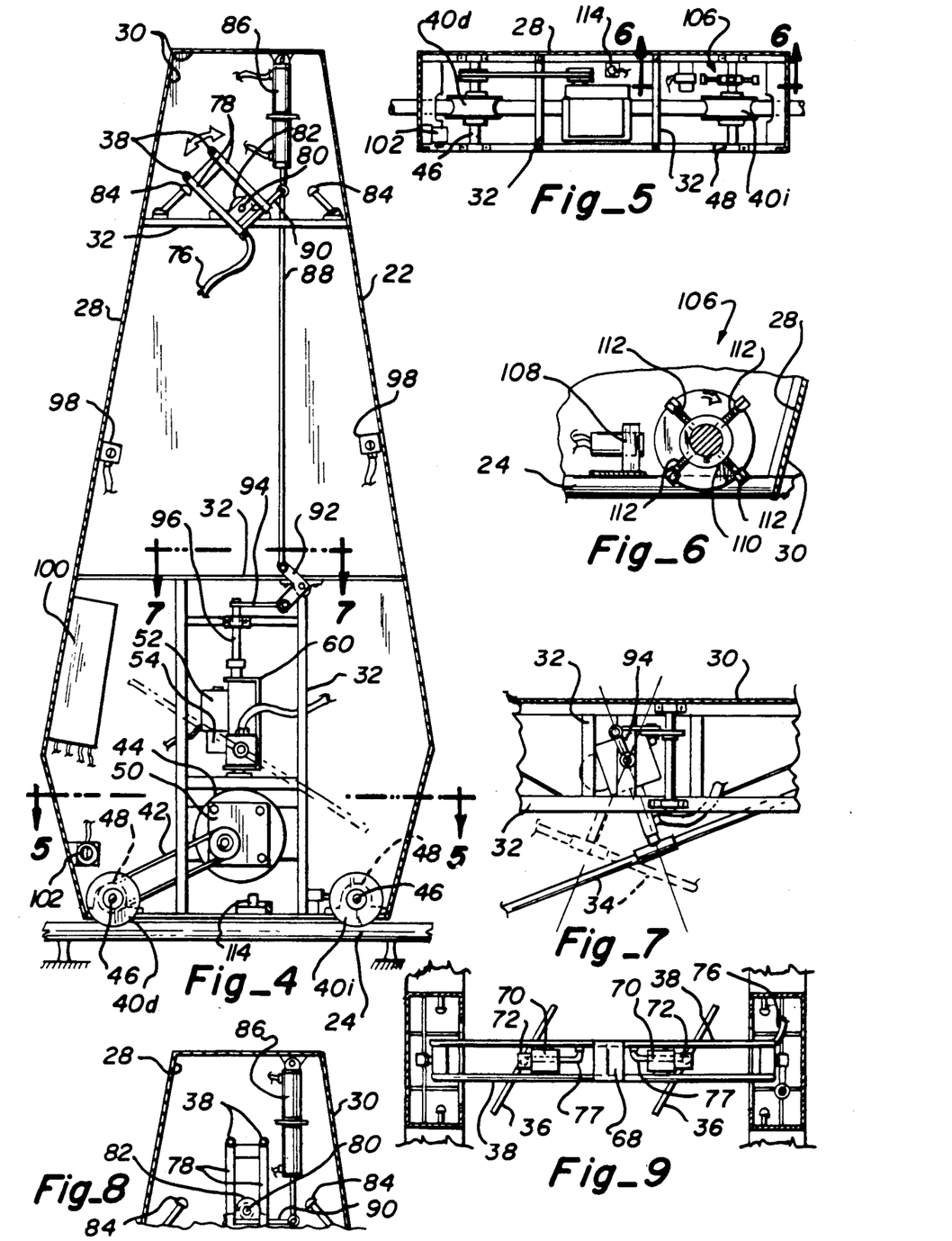
FIG. 4 is a vertical section taken along line 4—4 of FIG. 2.
FIG. 5 is a section taken along line 5—5 of FIG. 4.
FIG. 6 is a section taken along line 6—6 of FIG. 5.
FIG. 7 is a section taken along line 7—7 of FIG. 4.
FIG. 8 is a view of the upper portion of the apparatus as seen in FIG. 4 with the tiltable arms being shown in a centered position.
FIG. 9 is a section taken along line 9—9 of FIG. 2.

With particular reference to FIG. 4, it can be seen that the framework 22 of the apparatus is mounted on two pair of wheels 40d and 40i with one pair being associated with each side of the apparatus. The wheels are rotatably mounted at the bottom of the associated side of the framework with one wheel 40i on each side being merely an idler wheel while the opposite wheel 40d is driven by a belt 42 connection to a drive motor 44. The wheels are mounted on suitable axles 46 and bearings 48 so that the housing and framework can be reciprocally moved along the rails 24 in a smooth and efficient manner. A gear-reduction box 50 is operably connected to the drive motor 44 to impart a desired rotational speed to the driven wheel 40d. Drive motors 44 are provided on each side of the apparatus so that the apparatus can be retained in a perpendicular relationship with the guide rails thereby not placing the apparatus in a bind as it is moved along the rails.

Figure 11:
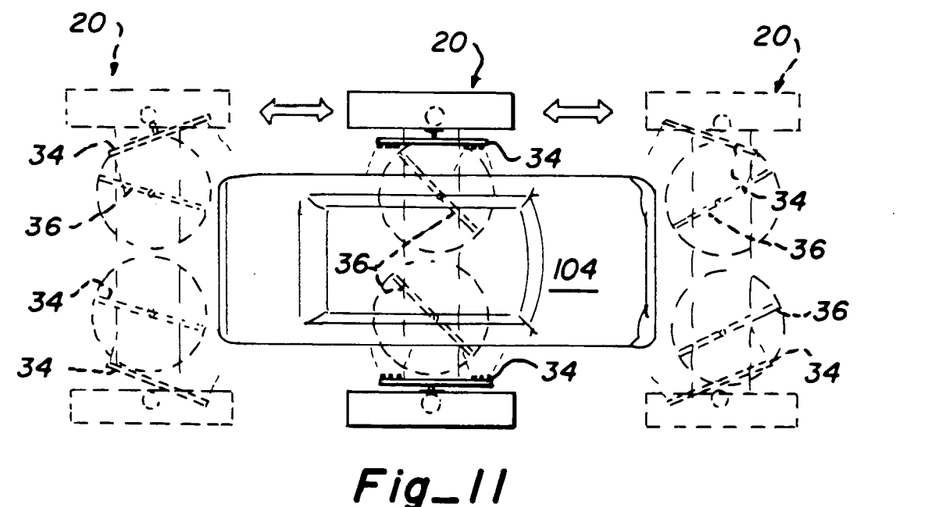
FIG. 11 is an operational plan view similar to FIG. 10 showing the apparatus in three different positions relative to a vehicle being cleaned thereby.

As best seen in FIG. 4, one of the lower vertically oriented rotating manifolds 34 is positioned on each side of the housing 20 at a location immediately above the drive motor 44. The vertically oriented rotating manifolds are operably connected to an electric motor 52 and gear box 54 through a flexible coupling 56 and a unique bearing seal element 58 as illustrated in FIG. 11. The electric motor 52 and gear box 54 are anchored to a yoke-shaped frame member 60 for pivotal movement in a manner to be described hereinafter. A box-like cover 62 for the bearing seal element 58 is provided for anchoring a fluid supply line 64 from a source of fluid to the bearing seal also in a manner to be described in detail hereinafter. It will therefore be appreciated that the electric motor 52 associated with each lower manifold 34 is adapted to selectively rotate the manifold while fluid is being delivered to the interior of the manifold and a plurality of jet nozzles 66 are spaced along the length of the manifold for emitting the fluids at a high pressure against the surface of a vehicle.

With reference to FIGS. 1, 2, 4 and 8, it can be seen that the upper generally horizontal rotating manifolds 36 are supported on and between associated pairs of the support frame members 38 which extend parallel to each other and in spaced relationship so as to be connected at a centered location by a plate bracket 68 allowing a very flat inverted V-shaped orientation of the upper support frame members 38. Each upper generally horizontal rotating manifold 36 is operably connected to a motor 70, gear box 72, flexible coupling 74, and bearing seal element 58 similarly to the vertically rotating manifolds 34, but the upper manifolds are, as mentioned previously, mounted on an associated pair of support frame members 38. The frame members 38 are hollow in construction and adapted to conduct cleaning fluid supplied thereto through a supply hose 76 to the bearing seal elements 58. Additional supply hoses 77 transfer the cleaning fluid from the frame members 38 to the bearing seal elements from locations close to the bearing seal elements.

The outermost ends of the parallel frame members 38 are supported on the upper ends of tiltable or pivot arms 78 which are operably connected to a pivot shaft 80 and bearings 82 as probably seen best in FIGS. 4 and 8. The bearings 82 for the shaft 80 are supported on horizontal frame members of the housing. The pivot arms 78 are pivotal forwardly and rearwardly through an arc so as to vary the angle of the upper rotating manifolds 36 with horizontal. It will, therefore, be appreciated, that the angle at which the cleaning fluid being dispensed from the upper rotating manifolds is directed at the vehicle can be varied by pivoting the pivot arms 78 in a pre-determined manner. A pair of tilt stops 84 are mounted on the framework at opposite sides of the pivot arm to limit the pivotal movement of the pivot arm.

The pivot arms 78 for the upper rotating manifolds and the yoke-shaped frame members 60 for the lower or vertically oriented manifolds are pivoted through use of a pair of axially aligned pneumatic cylinders 86 mounted adjacent to the top of each side housing with the pneumatic cylinders including an elongated actuating rod 88 extending vertically downwardly therefrom. The rod 88 is connected to an extension arm 90 on the pivot arm 78 whereby vertical reciprocating movement of the actuating rod will cause pivotal movement of the pivot arm and thus pivotal movement of the upper rotating manifolds 36.

Similarly, at the lower end of the actuating rod 88, linkage is provided including an L-shaped lever arm 92 and a pair of pivotally connected horizontal extension arms 94. One of the extension arms 94 is fixed to a vertical shaft 96 that is in turn fixed to the yoke-shaped frame member 60. This relationship is probably best illustrated in FIGS. 4 and 7 whereby it will be appreciated that vertical reciprocating movement of the actuating rod will create pivotal movement of the yoke-shaped frame member about a vertical axis. The vertical or lower rotating manifolds 34 can thereby be pivoted through an arc defining an infinite number of vertical planes.

The pneumatic cylinders 86 are operably connected whereby actuation of one of the cylinders causes the actuating rod 88 to move upwardly, actuation of the other cylinder causes the rod to move downwardly and simultaneous actuation of the two cylinders causes the rod to be retained in a centered location between its uppermost and lowermost positions. Obviously, the pivot arms 78 and linkage 92 and 94 are connected to the actuating rod so that when in the centered position, the upper rotating manifolds 36 are positioned at a centered location to direct the cleaning fluid in a substantially vertically downwardly convergent direction and the lower or vertical rotating manifolds 34 are lying in a plane that is parallel with the rails 24 on which the apparatus 20 is mounted.

In addition to the rotating manifolds 34 and 36, a pair of fixed or stationary nozzles 98 are mounted on each side of the framework 22 at positions that are approximately midway along the height of the sides of the framework to direct sprays of cleaning fluid at the vehicle.

The reciprocating movement of the apparatus is controlled by a computer mounted in a control box 100 on one of the sides of the housing. A photosensor 102, operably connected to the computer, is mounted on the framework 22 on one side of the apparatus and is adapted to sense the position of a vehicle 104 being washed by detecting the front and rear of the vehicle. This is accomplished in a conventional manner and a detailed description thereof is not deemed necessary.

As best seen in FIGS. 4 and 6 an index counter 106 is also mounted on the apparatus adjacent to the idler wheel 40i on one side of the apparatus and includes a proximity switch 108 adjacent to a star-shaped indexer 110 which is fixed for rotation with the idler wheel. The indexer 110 has a plurality of spokes 112 thereon adapted to pass in close proximity to the proximity switch 108 so that the number of passes of a spoke past the proximity switch can be counted by the computer. In this manner, the distance the apparatus 20 moves in traversing from one end of a vehicle to the other can be accurately determined for proper positioning of the apparatus and tilting of the wash manifolds 34 and 36 in a manner to be described later.

The apparatus also includes a position detecting proximity switch 114 which is mounted adjacent the bottom of the framework on one side thereof and is adapted to detect tabs 116 positioned on the adjacent rail 24 at locations defining the outer limits of travel of the apparatus.

The various components utilized to control operation of the apparatus in conjunction with the computer are operatively associated in a manner that can probably be best understood by describing a typical operation of the apparatus. In operation of the apparatus, it is typically stationed at a home location near the forward end of the wash area with none of the working components being activated. A vehicle 104 is advanced into the wash area until the front wheels of the vehicle contact a pressure switch 118 which activates a red light (not shown) to tell the operator of the vehicle to stop the vehicle at that particular location. After a predetermined time period, the drive motor 44 for the apparatus is activated causing the apparatus to move rearwardly along a linear path until the photosensor 102 detects the front of the vehicle at which time the drive motor stops and the computer activates the electric motors associated with the upper and lower rotating manifolds 36 and 34 respectively in addition to activating a first pneumatic cylinder 86 that drives the actuating rod 88 downwardly to its lowermost extent causing the upper rotating manifolds 36 to be inclined in a rearwardly directed position and the vertical or lower rotating manifolds 34 to be positioned so as to direct cleaning fluid in a rearwardly convergent direction toward the front of the vehicle as best seen in the right side position of FIGS. 9 and 10. It will be appreciated that in this manner the cleaning fluid is dispensed on the front of the vehicle so as to apply the cleaning fluid at the affected surfaces.

Normally on the first rearward pass of the apparatus, a presoak or soap solution is dispensed on the vehicle to begin chemically breaking down dirt, grime and other materials on the surface of the vehicle. After a predetermined time period the computer activates the drive motor and both pneumatic cylinders 86 so that the rotating manifolds 34 and 36 are pivoted into their centered positions thereby dispensing the presoak solution substantially vertically downwardly and perpendicularly at the sides of the vehicle as the apparatus crosses thereover. This operation is best seen in the center position of the apparatus in FIGS. 9 and 10.

When the photosensor 102 detects that the apparatus is adjacent to the rear of the vehicle, a predetermined time delay is activated so that upon movement of the apparatus a small distance further the first pneumatic cylinder 86 is deactivated causing the manifolds 34 and 36 to tilt in the opposite direction so that the upper rotating manifolds direct the cleaning fluid in a generally forward and downward direction while the lower rotating manifolds deliver the cleaning fluid at a forwardly convergent angle as shown in the left side position of FIGS. 9 and 10. After a predetermined time, the drive motor 44 is deactivated to terminate the rearward movement of the apparatus and the photosensor 102 is also deactivated. From this point forward, the apparatus relies on the information fed to the computer by the index counter 106 so that reciprocal movement of the apparatus will pass along a path the length of which is suitable for the particular vehicle being washed.

After another predetermined time period, the computer again activates the drive motor 44 in an opposite direction causing the apparatus to move forwardly and after a predetermined number of counts by the index counter, the deactivated first pneumatic cylinder 86 is activated to again center the rotating manifolds as the apparatus passes over the central portion of the vehicle. The presoak solution is again dispensed on the vehicle as the apparatus is moving forwardly thereacross. After the apparatus has moved past the front end of the vehicle a predetermined distance, the second pneumatic cylinder is de-activated to tilt the rotating manifolds for dispensing fluid against the front of the vehicle.

After a predetermined time period, the supply of fluid to the rotating manifolds is changed from a presoaking solution to high-pressure water for rinsing the soap from the vehicle. The apparatus then follows a similar path to that defined in regard to the presoaking step while moving rearwardly and then again forwardly but with the entire movement being controlled by the computer and the index counter 106 rather than the photosensor.

After the apparatus returns to the front of the vehicle and the rotating manifolds have been tilted to rinse the front of the vehicle, they are again centered by activation of both pneumatic cylinders 86 and the apparatus is driven forwardly from that location until it reaches its home position at which time a green light (not shown) is activated telling the individual in the vehicle that he or she is free to drive forwardly out of the wash area along the driveway. It will be appreciated that other wash cycles can be programmed into the computer so that waxes or additional wash cycles can be included in an entire wash operation. It should also be noted that cleaning fluid is fed to the fixed nozzles at the same times as it is fed to the rotating manifolds.

The proximity switch 114, which is positioned adjacent to one of the rails and adapted to detect tabs 116 mounted on the adjacent rail 24, is actually a fail-safe detector to identify the travel limits of the apparatus. In other words, a tab 116 is provided at the forwardmost extent of movement of the apparatus and a similar tab is provided at the rearwardmost extent of travel of the apparatus. Once the apparatus has reached either of these locations, it is automatically stopped. At the rearwardmost position, the direction of movement of the apparatus is reversed through suitable deactivation and activation of the drive motor 44. The tabs play an important role when an extra long vehicle such as a recreational vehicle is positioned in the apparatus and the recreational vehicle extends beyond the limits of operation of the apparatus. In such instances, the photosensor would never detect the rear end of the vehicle so when the apparatus reaches its rearwardmost extent, the proximity switch 114 detects the associated tab 116 and tells the apparatus to reverse its direction of movement without tilting the rotating manifolds 34 and 36.

As mentioned previously, each rotating manifold is connected to its own electric motor by a bearing seal element 58 which has been uniquely designed so that common members in the bearing seal element serve not only as a bearing surface for the rotating shaft on which the rotating manifolds 34 and 36 are mounted but also serve as a seal for the shaft to prevent liquid from escaping during operation of the device.

Figure 12:
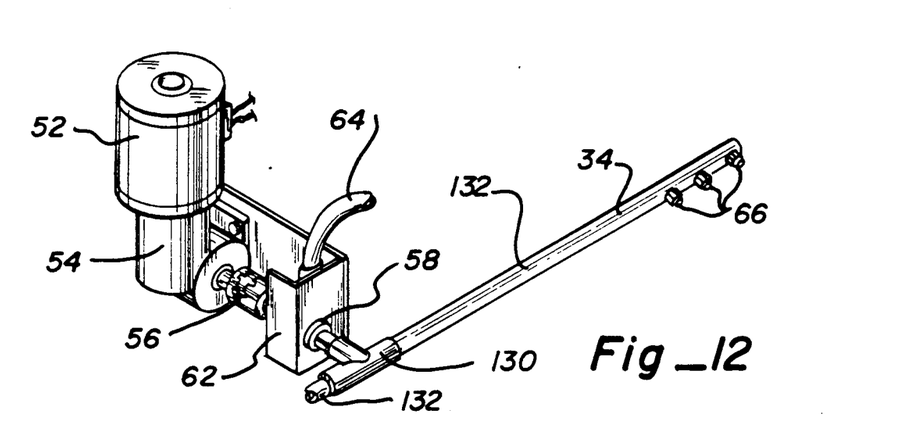
FIG. 12 is a perspective view of one of the lower rotating dispensing manifolds connected to a power source and liquid supply through the bearing seal of the present invention.
Figures 13, 14:
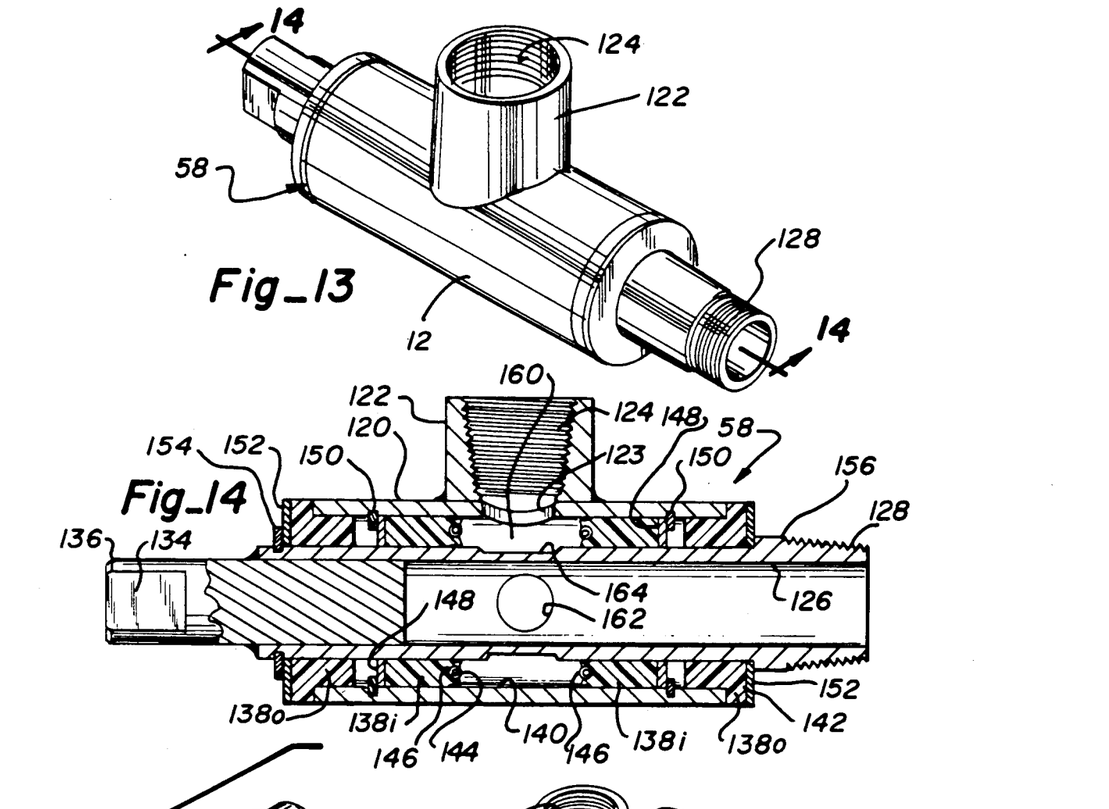
FIG. 13 is a perspective view of the bearing seal of the present invention.
FIG. 14 is a section taken along line 14—14 of FIG. 13.
Figure 15:
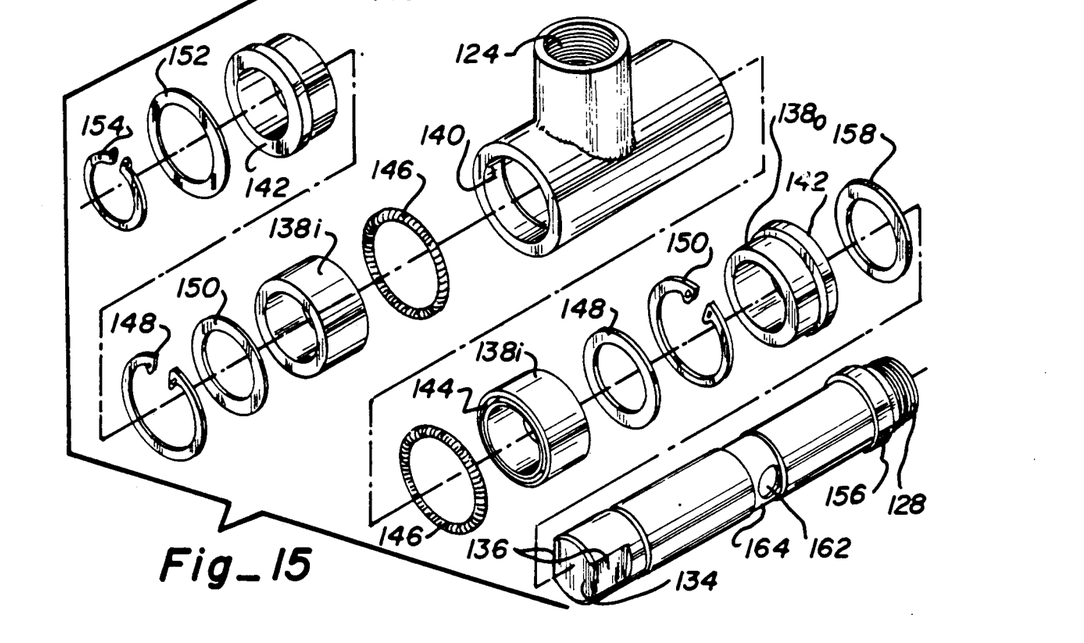
FIG. 15 is an exploded perspective view of the bearing seal of the present invention illustrating the various component parts thereof.

The bearing seal element 58 is probably best seen in FIGS. 12 through 14 to include an outer sleeve 120 of generally cylindrical configuration having a laterally disposed coupling 122 defining lateral opening 123 at its longitudinal center. The coupling includes internal threads 124 to receive the end of the supply hose or line 64 through which cleaning fluid can be delivered to the interior of the sleeve 120. The supply hose 64 is operatively connected to supplies of suitable cleaning fluid in a conventional manner.

A hollow shaft 126 extends axially through the sleeve 120 so as to project from opposite ends thereof. A fluid delivery end of the hollow shaft 126 has external threads 128 thereon adapted to receive a T-shaped coupling 130 whereby manifold elements 132 can be connected to the coupling to extend in opposite directions thereby defining one of the rotating manifolds 34 or 36 described hereinbefore. The opposite end of the hollow shaft 126 includes a solid insert or drive shaft 134 which is welded or otherwise suitably connected to the sleeve 120 for unitary rotation therewith. The drive shaft has flat surfaces 136 thereon so that it can be suitably connected to an electric motor through a flexible coupling as described previously. It will, therefore, be appreciated that rotation of the drive shaft 134 will cause rotation of the hollow shaft 126 thereby rotating the manifold 34 or 36 in a desired manner.

The hollow shaft 126 is rotatably supported within the sleeve 120 by two pair of bearing seal members 138*i* and 138*o* which are generally cylindrical in configuration and bridge the space between the hollow shaft and the interior surface 140 of the sleeve in a fluid-tight manner. Each pair of bearing seal members includes an inner bearing seal member 138*i* and an outer bearing seal member with the outer bearing seal member 138*o* having a circumferential flange 142 adapted to abut an associated end of the outer sleeve. The inner bearing seal member 138*i* is spaced axially inwardly from the outer member 138*o* and includes a circumferential recess 144 in its innermost axial end which receives a compression spring 146 that is adapted to assist in holding the seal in engagement with the hollow shaft 126 even after extended usage. The use of such compression springs is not new in the art so the theory behind the operation thereof will not be explained in detail.

The inner bearing seal members 138*i* are retained in position by thrust washers 148 that are rigid and have the same inner and outer diameters as the inner bearing seal members. The thrust washers 148 are retained in position by snap rings 150 that are anchored in peripheral grooves provided in the interior surface 140 of the sleeve. The outer bearing seal member 138*o* at the drive end of the hollow shaft is held in position by a thrush washer 152 that is positively positioned by a snap ring 154 seated in an annular groove provided in the hollow shaft. The opposite end of the hollow shaft has an enlarged diameter portion 156 that is adapted to abut against a thrust washer 158 to hold the adjacent outer member in position at the outlet end of the hollow shaft.

The inner members 138*i* primarily serve as bearings for the rotating hollow shaft 126 and to provide a liquid-tight seal to prevent fluid from leaking from the bearing seal element 58 while the outer elements 138*o* primarily serve as thrust bearings to keep the shaft 126 aligned. In experimentation prior to developing the bearing seal element 58 of the present invention, a single pair of bearing seal members were tried and did not function properly as the shaft would tend to become misaligned, but by separating the single pair into two pair, the desired operation of the bearing seal element was obtained. It will be appreciated that a chamber or cavity 160 is defined between the inner bearing seal members 138i which is in communication with the lateral opening 123 through the sleeve so that fluid can be delivered to this chamber. Also in communication with the chamber 160 are a pair of transverse bores or passages 162 through the rotating hollow shaft establishing communication between the interior of the shaft and the chamber 160. In this manner, fluid delivered to the chamber 160 through the lateral opening 123 passes into the interior of the shaft via the transverse bores 162 and can therefore be dispensed out of the rotating shaft through the manifold end of the shaft. The chamber 160 is enlarged slightly by a reduced outer diameter segment 164 of the rotating shaft which tends to direct and funnel the liquid into the transverse bore.

In the preferred embodiment of the invention, the bearing seal members 138i and 138o are made of an ultra-high molecular weight (UHMW) polyethylene material which is found to be suitable in forming a long-wearing bearing surface as well as an adequate seal. In other words, the bearing seal members serve to both seal the entire element 58 and provide a long-wearing bearing surface without the need for separate seal and bearing elements thereby simplifying the construction of the element.

Although the present invention has been described with a certain degree of particularity, it is understood that the present disclosure has been made by way of example, and changes in detail or structure may be made without departing from the spirit of the invention, as defined in the appended claims.

I claim:

1. An element for delivering fluid from a stationary source to a rotating receptacle comprising in combination,
    a rigid fluid impervious sleeve having a side wall and opposite open ends, said side wall having an interior surface and a lateral opening through the side wall communicating with the interior of the sleeve, and a connector in communication with said lateral opening, said connector being suitable for connection to said stationary source of fluid whereby fluid can be delivered through said lateral opening into the interior of said sleeve,
    a hollow rotatable shaft disposed in said sleeve for rotational movement relative to the sleeve, means on said rotatable shaft and cooperating with said sleeve for prohibiting relative axial movement between said hollow shaft and the sleeve, said rotatable shaft having a cylindrical side wall with an exterior surface in opposed confronting relationship with the interior surface of the sleeve and including means for connection to a rotatable drive source, means for connecting the hollow rotatable shaft to said rotating receptacle such that the rotating receptacle is in fluid communication with the interior of the hollow shaft, and a transverse opening in said cylindrical side wall, and
    a pair of spaced bearing seal members disposed in the interior of said stationary sleeve in continuous fluid tight engagement with said interior surface of the side wall of the sleeve and with the exterior surface of the rotatable shaft, each of said spaced bearing-seal members constituting a single element that continuously functions as a bearing between said sleeve and the hollow rotatable shaft as a fluid-tight seal between the sleeve and the hollow rotatable shaft, said bearing-seal members being disposed on opposite sides of said lateral and transverse openings so as to define a chamber between said sleeve and rotatable shaft which is in communication with the lateral and transverse openings whereby fluid entering the coupling through said stationary source can be delivered to the rotating receptacle without fluid loss.

2. The element of claim 1 wherein said bearing seal members include bearing surfaces made of an ultra high molecular weight polyethylene.

3. The element of claim 1 wherein there are two pair of said bearing seal members and wherein each bearing seal member is spaced from the other bearing seal member.

4. The element of claim 1 further including retention means associated with said sleeve for retaining the bearing seal member in fixed locations.

5. The element of claim 1 wherein said means for connection to a rotatable drive shaft is a solid shaft fixedly secured to the hollow rotatable shaft.

6. The element of claim 1 wherein one pair of said bearing seal members are of generally cylindrical configuration with a radially outwardly directed flange adapted to abut and form a sealed relationship with an associated end of the stationary sleeve.

7. The element of claim 1 wherein said bearing seal members include bearing surfaces made of an ultra high molecular weight polyethylene.

8. The element of claim 2 wherein said bearing seal members are solid ultra high molecular weight polyethylene.

9. The element of claim 3 wherein said bearing seal members are solid ultra high molecular weight polyethylene.

10. An element for delivering fluid from a stationary source to a rotating receptacle comprising in combination,
    a rigid fluid impervious sleeve heaving a side wall defining an interior cylindrical surface and opposite open ends, a lateral opening through said side wall at approximately the longitudinal center of the sleeve, and a connector on said side wall in communication with said lateral opening, to said stationary source of fluid whereby fluid can be delivered through said lateral opening into the interior of said sleeve,
    a hollow rotatable cylindrical shaft disposed in said sleeve for rotational movement relative to the sleeve, said rotatable shaft having a cylindrical external surface of smaller radius than the internal surface of the sleeve with said internal and external surfaces being in spaced confronting relationship, a drive shaft at one end of said rotatable shaft forming a part of said rotatable shaft and being adapted to be operatively connected to a rotary drive source, means at the opposite end of said rotatable shaft adapted to be connected to said rotating receptacle such that the rotating receptacle is in fluid communication with the interior of the hollow shaft, and a transverse opening in the cylindrical wall of the rotatable shaft in alignment with the lateral opening in said sleeve, and
    a first pair of cylindrical bearing seal members being disposed axially on opposite sides of said lateral and transverse openings and bridging the space between the sleeve and the rotatable shaft so as to form a chamber between the sleeve and the rotatable shaft which is in fluid communication with said lateral and transverse openings, and a second pair of cylindrical bearing seal members disposed adjacent to the open end of said sleeve, said second pair of cylindrical bearing seal members having a radially outwardly directed flange adapted to abut the end of the sleeve in sealed relationship therewith, said first and second pairs of bearing seal members being made of an ultra high molecular weight polyethylene.

* * * * *